United States Patent

Duffee et al.

[11] Patent Number: 5,294,132
[45] Date of Patent: Mar. 15, 1994

[54] SEMI-CARTRIDGE SEAL

[75] Inventors: Henry S. K. Duffee; James M. Downing, both of Florence, S.C.

[73] Assignee: Five Star Seal Corporation, Florence, S.C.

[21] Appl. No.: 918,031

[22] Filed: Jul. 24, 1992

[51] Int. Cl.$^5$ ............................................... F16J 15/34
[52] U.S. Cl. .................................. 277/9.5; 277/11; 277/38; 277/81 R
[58] Field of Search .................. 277/9, 9.5, 11, 38, 277/81 R, 85; 33/567, 645, 533, 600

[56] References Cited

U.S. PATENT DOCUMENTS

| | | | |
|---|---|---|---|
| 2,247,505 | 1/1939 | Kohler | 277/81 R X |
| 2,551,059 | 5/1951 | Shockley | 33/567 |
| 3,042,414 | 7/1962 | Tracy | 277/11 X |
| 3,972,536 | 8/1976 | Warner et al. | |
| 4,434,988 | 3/1984 | Warner | |
| 4,538,820 | 9/1985 | Duffee | |
| 4,538,821 | 9/1985 | Wallace | 277/81 R |
| 4,688,807 | 8/1987 | Warner | 277/81 R X |
| 4,691,927 | 9/1987 | Sudol et al. | 277/81 R X |
| 4,872,689 | 10/1989 | Drumm | 277/9.5 |
| 5,072,949 | 12/1991 | Lopperi | 277/81 R X |
| 5,116,066 | 5/1992 | Crawford | 277/81 R |

*Primary Examiner*—William A. Cuchlinski, Jr.
*Assistant Examiner*—Scott W. Cummings
*Attorney, Agent, or Firm*—Jacobson, Price, Holman & Stern

[57] ABSTRACT

A semi-cartridge seal is provided incorporating two components each comprising a plurality of preassembled parts. The first component includes an annular holder for snug but slidable positioning along a shaft and loosely supports an annular seal face structure therefrom with an O-ring seal forming a fluid tight seal between the seal face structure and the annular holder, centering the seal face structure relative to the annular holder and frictionally resisting rotation of the sell face structure relative to the annular holder, the latter being sealed relative to the associated shaft. The second component includes an annular gland insert loosely disposed about the shaft but including a centering bushing centering the gland insert relative to the shaft and the gland insert loosely supports a second seal face structure therefrom with a second O-ring seal forming a fluid tight seal between the second seal face structure and the annular gland insert and centering the second seal face structure relative to the annular gland insert, the second annular seal face structure being guidingly supported from the annular gland insert for shifting axially relative thereto and being yieldingly biased in one direction relative to the annular gland insert.

9 Claims, 2 Drawing Sheets

SEMI-CARTRIDGE SEAL

BACKGROUND OF THE INVENTION

1. FIELD OF THE INVENTION

This invention relates to mechanical shaft seals and more specifically to a shaft seal which is neither a purely component seal nor a purely cartridge-type seal. Rather, the semi-cartridge seal of the instant invention utilizes two cartridge components comprising inner and outer components each consisting of a plurality of assembled parts.

2. DESCRIPTION OF RELATED ART

Various forms of sealing devices have been used between stationary housing members and rotating shafts. These devices range from various braided and compressed packings to various types of end face mechanical seals. These end face mechanical seals vary in design from component seals which are assembled insitu on the shaft during equipment assembly to those designs which are termed cartridge seals such as that disclosed in U.S. Pat. No. 4,538,820 which are preassembled in a factory or other location and merely placed into position and fastened to the equipment by bolting, set screws or other similar methods.

Upon removal of some types of centering and spacing devices, the cartridge seal is ready for operation. The advantage of this preassembled cartridge-type seal has been ease of installation and longer seal life, partly due to the prevention of installation errors common to the aforementioned component design of seals which are assembled on the shaft. The errors primarily deal with errors in centering the stationary portion or portions of the seal around the rotating shaft or in precisely locating the rotating portion or portions of the seal in relation to the stationary portion or portions.

SUMMARY OF THE INVENTION

The semi-cartridge seal of the instant invention incorporates two components which each comprise preassembled multiple parts and which therefore avoid many of the errors which occur in the assembly of numerous components of component seals assembled by less than maximum trained technicians in the field.

A first component of the two components of the semi-cartridge seal is designed for ease in snug fitting on, longitudinal positioning along, automatic fluid tight sealed engagement with and subsequent positive anchoring in adjusted position on the associated rotating shaft. The first component includes an annular seal face structure which is loosely supported from a holder sleeve releasably mounted in fixed position on the associated shaft in a manner establishing a fluid tight seal with the shaft and an O-ring seal forms a fluid tight seal between the annular seal face structure and the holder sleeve and automatically centers the annular seal face structure relative to the holder sleeve, the seal face means loosely receiving the associated shaft therethrough.

The second component of the semi-cartridge seal includes a stationary annular gland insert to be secured in position relative to the associated housing portion and relative to which the associated shaft rotates and the annular gland insert includes a centering bushing whereby the annular gland insert is automatically centered concentric with the associated rotating shaft. Furthermore, the second component includes an annular seal face holder loosely telescoped within one end of the annular gland insert and from which the second annular seal face structure is supported opposing the first mentioned annular seal face. The holder is keyed to the annular gland insert for guided axial shifting relative thereto and is supported from the annular gland insert in fluid tight sealed engagement therewith in a manner allowing axial shifting of the holder relative to the annular gland insert and also centering the holder relative to the annular gland insert, the second annular seal face structure being supported from the holder and thereby also being properly centered relative to the associated rotating shaft.

After assembly of the two semi-cartridge seal components relative to the rotating shaft and the associated housing portion, a gland or gland plate disposed about the shaft is tightened relative to the associated housing portion in order to draw the properly centered annular gland insert into tight sealed engagement with the housing portion independent of any distortion of the annular gland insert and the attendant sealing means serving to form a fluid tight seal between the annular gland insert and the axially shiftable holder for the annular seal face structure of the second component.

The main object of this invention is to provide a semi-cartridge seal assembly which includes the major advantages of a cartridge-type seal, but which requires less axial length and radial clearance than the usual cartridge-type seal.

Still another object of this invention is to provide a semi-cartridge seal including the advantages of a cartridge-type seal but which utilizes a two component cartridge system which enables installation of the seal structure in a manner such that tightening of the gland does not deform the supporting and sealing parts of the seal and which thereby provides a seal which may be operated under considerably higher pressures.

Another very important object of this invention is to provide a semi-cartridge seal incorporating two assembled components and which may, through the use of a positioning gauge, be properly axially positioned relative to the associated relative shaft and the corresponding stationary housing portion face opening through which the shaft extends.

A final object of this invention to be specifically enumerated herein is to provide a semi-cartridge seal in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
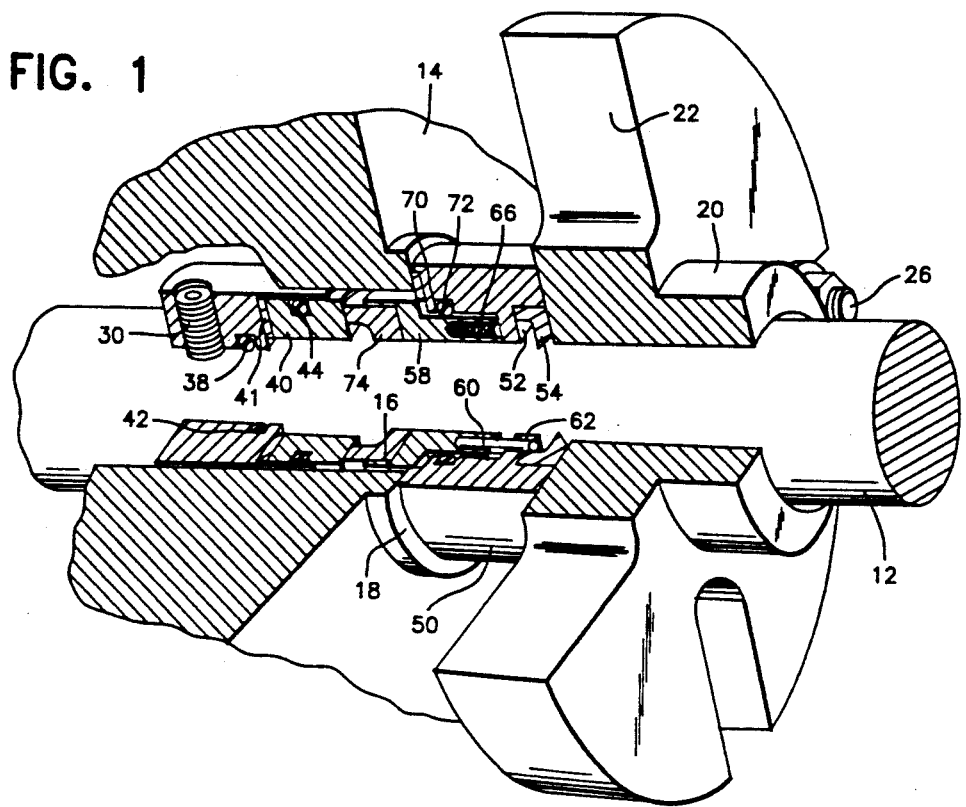
FIG. 1 is a fragmentary vertical sectional view taken substantially upon a plane passing through the longitudinal center line of a first form of semi-cartridge seal assembly constructed in accordance with the present invention.
Figure 2:
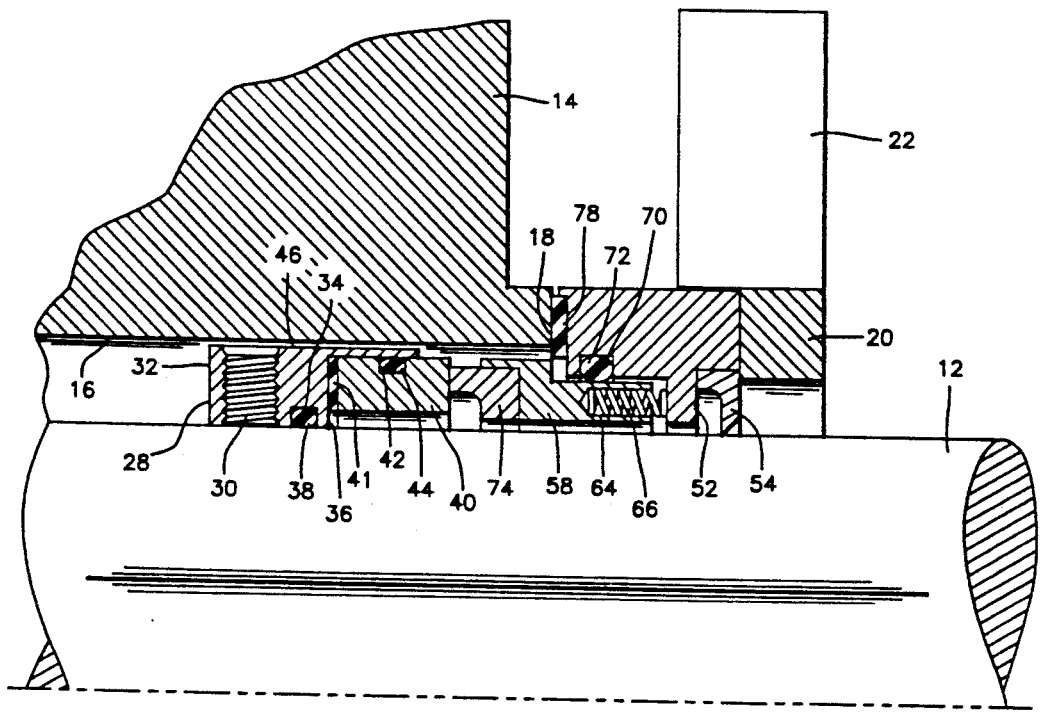
FIG. 2 is perspective view of adjacent housing, shaft and gland portions with the semi-cartridge seal assembly of the instant invention operatively associated therewith, portions of the housing portion seal assembly and gland being broken away and illustrated in both vertical and horizontal section, a modified form of gland being illustrated.

Referring now more specifically to the drawings the numeral 10 generally designates a first form of semi-cartridge seal assembly utilized in conjunction with a rotary shaft 12 and a stationary housing portion 14. The housing portion 14 defines an opening 16 formed therethrough which opens through a seal face 18 extending about the opening 16 and a gland or plate 20 provided with outer periphery radial slots 22 has a central opening 24 formed therethrough through which the shaft 12 is loosely received, the gland or plate 20 being anchored relative to the housing portion 14 by nutted studs 26 carried by the housing portion 14 and secured through the slots 22.

The seal assembly 10 includes a first seal face holder sleeve 28 which has an inside diameter only slightly greater than the diameter of the shaft 12 and is equipped with a plurality of radial set screws 30 spaced about the inner end 32 thereof. In addition, the holder sleeve 28 includes an inner peripheral groove 34 and defines an axially and inwardly opening recess or counterbore 36 formed in its outer end. The sleeve 28 is loosely but closely received over the shaft 12 and an O-ring seal 38 is disposed within the inner peripheral groove 34 and forms a fluid tight seal between the holder sleeve 28 and the shaft 12 and further serves to properly center the holder sleeve 28 concentric with the shaft 12, the holder sleeve 28 being loosely received in the opening 16.

A first annular seal face member 40 is closely loosely received within the recess or counterbore 38 and projects axially outwardly thereof. The approximate longitudinal center of the seal face member 40 is provided with an outer circumferential groove 42 in which an O-ring seal 44 is seated, the O-ring seal 44 forming a fluid tight seal between the holder sleeve 28 and the seal face member 40 and also serving to center the seal face member 40 into position coaxial with the holder sleeve 28 and the shaft 12.

The parts 28-44 above referred to comprise the assembled parts which make up the inner component 46 of the seal assembly 10, the inner component 46 being provided in preassembled condition.

The seal assembly 10 also includes an outer component 48 consisting of an annular gland insert 50 which is loosely disposed about the shaft 12 and includes an outer end recess or counterbore 52 in which a carbon centering bushing 54 is disposed, the bushing 54 serving to center the annular gland insert 50 relative to the shaft 12. The inner end of the annular gland insert 50 also includes a counterbore or recess 56 which opens radially inwardly toward the shaft 12 and axially outwardly of the inner end of the annular gland insert 50.

A holder sleeve 58 is loosely disposed about the shaft 12 and is loosely received in the counterbore or recess 56. Further, the holder sleeve 58 includes a plurality of circumferentially spaced pins 60 supported therefrom and projecting axially outwardly of the outer end of the holder sleeve 58, the outer ends of the pins 60 being slidably received in circumferentially spaced bores 62 formed in the annular gland insert 50 between the counterbores or recess 52 and 56. Further, the holder sleeve 58 includes circumferentially spaced axial blind bores 64 opening axially outwardly of the outer end of the holder sleeve 58 and in which compression springs 66 are seated. The compression springs 66 project endwise outwardly from the outer end of the holder sleeve 58 and bear against that portion of the annular gland insert 50 disposed between the counterbores or recesses 52 and 56 between adjacent pins 60.

The annular gland insert 50 also includes, adjacent its inner end, an inner peripheral circumferential groove 70 in which an O-ring seal 72 is disposed, the O-ring seal 72 forming a fluid tight seal between the annular gland insert 50 and the holder sleeve 58. Also, as is the case with the O-ring seals 38 and 44, the O-ring seal 72 further serves to center the holder sleeve 58 in position coaxial with the shaft 12. Further, the inner end of the holder sleeve 58 supports the second annular seal face member 74 therefrom.

The parts 50-74 comprise those preassembled parts of the second component 48.

After the components 46 and 48 are assembled as illustrated in FIG. 1, the gland or gland plate 20 is assembled relative to the shaft 12 and the nutted studs 26 are used to draw the gland or gland plate 20 toward the seal face 18, an annular seal or gasket 78 being disposed between the seal face 18 and the inner end face of the annular gland insert 50. As the nutted studs 26 are tightened, the gasket 78 is clamped between the annular gland insert 50 and the seal face 18.

It is pointed out that unintentional over tightening of the nutted studs 26 (or other similar fasteners which may be used) cannot distort the annular gland insert 50 to the extent that the sealing capacity of the O-ring seal 72 is reduced. Thus, the working pressure rating of the seal assembly 10 is increased considerably over the working pressure rating of the shaft seal disclosed in U.S. Pat. No. 4,538,820.

Figure 3:
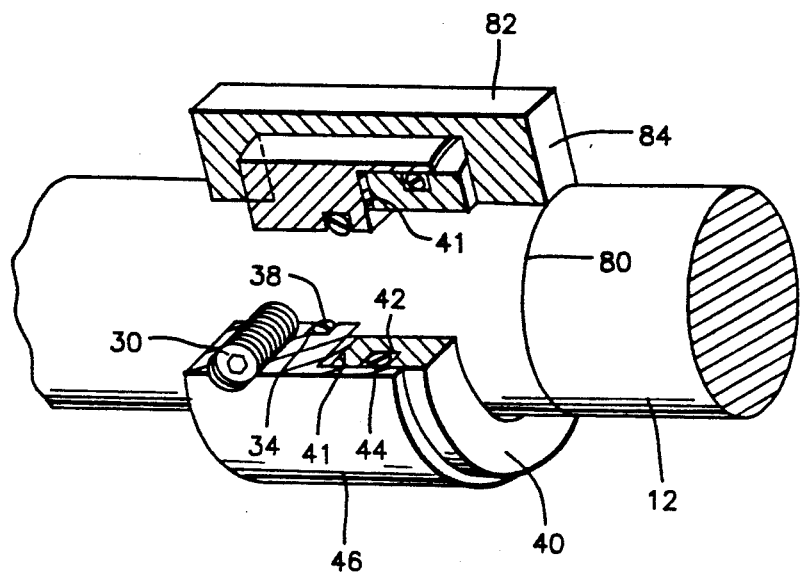
FIG. 3 is a fragmentary perspective view of the shaft illustrated in FIGS. 1 and 2 as well as the internal component assembly of the semi-cartridge seal in operative association with the shaft and with a U-shaped gauge in use axially positioning the internal component of the semi-cartridge seal along the shaft in relation to a scribe mark previously placed thereon in alignment with the outer face of the shaft opening of the associated housing portion.
Figure 4:
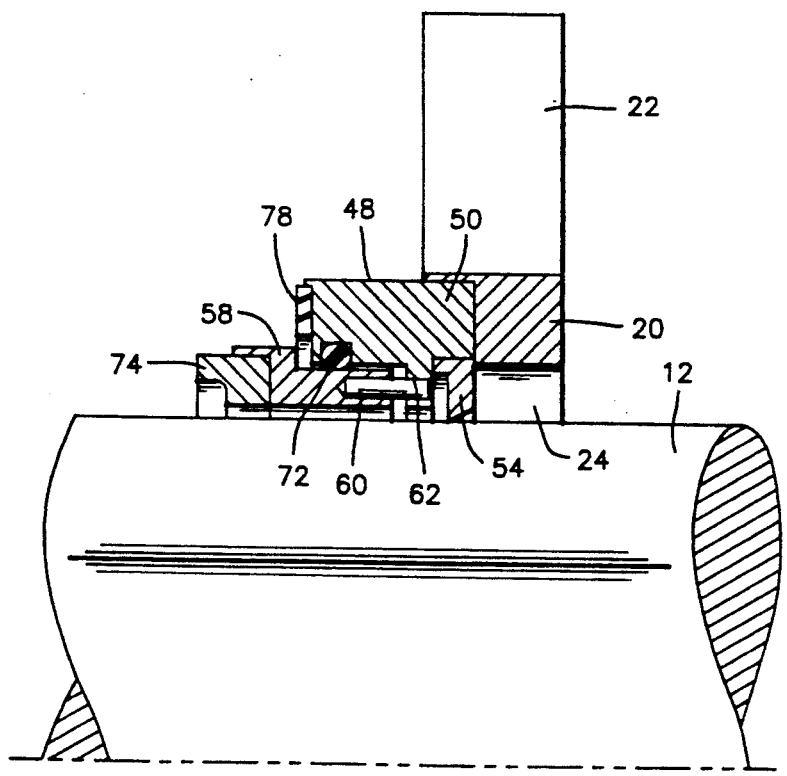
FIG. 4 is a fragmentary vertical sectional view illustrating the manner in which the outer assembled component of the semi-cartridge seal assembly is automatically centered relative the shaft and further illustrating the manner in which a gland plate may be engaged with the outer component for axially displacing the latter toward the inner seal component.

With attention now invited more specifically to FIGS. 1 and 3 of the drawings, it is to be noted that in FIG. 1 the face of the first annular seal face member 40 engaged with the second annular seal face member 74 is spaced a predetermined distance inward of the seal face 18 of the housing portion 14. In order to properly install the first component 46 initially relative to the shaft 12, the shaft 12 is marked as at 80 about its circumference in alignment with the seal face 18. Then, a U-shaped gauge 82 is utilized to initially properly position the first component 46 longitudinally of the shaft 12 in the manner illustrated in FIG. 3 with the outer surface 84 of the gauge 82 aligned with the mark 80. The gauge 82 is moved about the shaft 12 to ensure that the holder sleeve 28 is not only in proper axially shifted position relative to the shaft 12 but also fully aligned therewith. Then, a few of the set screws 30 are lightly touched to the shaft 12 in order to stationarily position the holder sleeve 28 in the desired position and the gauge 82 is removed.

Thereafter, the remaining set screws may be lightly touched to the shaft 12 in order to ensure maintaining proper positioning of the first component 46 relative to the shaft 12 and then set screws 30 are progressively tightened in any suitable predetermined sequence. Thereafter, the housing portion 14 may be moved into position relative to the shaft 12 and first component 46 and the second component 48 and gland or gland plate 20 may be subsequently positioned about the shaft 12.

Also, it is pointed out that the seal face member 40 seats against an annular seat member 41 seated in the counterbore 36 and that the pressure exerted by springs 66 through seal face member 74 on the seal face member 40 creates further frictional resistance against rotation of the seal face member 40 relative to holder sleeve 28. Further, seat member 41 and O-ring seal 44 isolate the relative fragile seal face member 40 from the holder sleeve 28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a stationary housing portion defining an opening therethrough and a shaft rotatable relative to said housing portion and projecting loosely through said opening, a seal assembly including a first seal face holder sleeve slidably and rotatably mounted on said shaft in position recessed inwardly of the end of said opening facing outwardly of said housing portion, the outer axial end of said first holder sleeve facing outwardly of said opening defining a first seal cavity concentric with said sleeve and opening axially outwardly of said outer end, first annular seal face means loosely receiving said shaft therethrough and disposed in said first seal cavity with a first outer end thereof projecting outwardly of said first seal cavity and disposed normal to the axis of rotation of said shaft, first annular seal means establishing a fluid tight seal between said shaft and said first holder sleeve, second annular seal means establishing a fluid tight seal between said first annular seal face means and said first holder sleeve and centering said first annular seal face means radially in said cavity and frictionally resisting rotation in said cavity, an annular gland insert loosely disposed about said shaft outwardly of said opening and including inner and outer axial ends, said inner axial end facing toward said first seal face outer end and being spaced axially from said first seal face outer end and defining a second seal cavity concentric with said gland insert opening axially toward said first annular seal face means, a second annular seal face means loosely receiving said shaft therethrough and loosely disposed in said second seal cavity with a first end thereof slidably and nonrotatably disposed in said second seal cavity and a second end projecting outwardly of said second seal cavity toward said first outer end and disposed normal to the axis of rotation of said shaft and rotatably and sealing engaged with said first outer end, key means keying said second seal face means in said second seal cavity against rotation relative to said annular gland insert while allowing relative axial displacement between said second seal face means and said annular gland insert, biasing means operatively connected between said second seal face means and the annular gland insert yieldingly biasing said second seal face means outwardly of said second seal cavity, third annular seal means establishing a fluid tight seal between said annular gland insert and said second seal face means and centering said second seal face means relative to said annular gland insert, and an annular centering bushing interposed between said annular gland insert and said shaft disposed outwardly of said second annular seal means and centering said annular gland insert relative to said shaft, said annular gland insert and housing portion including respective seal surfaces extending about said shaft and registered with each other, and gland plate means disposed about said shaft outwardly of said annular gland insert for adjustable connection with said housing portion to shift said gland plate means along said shaft into operative position with said seal surfaces disposed in relative seated relation.

2. The seal assembly of claim 1 wherein said annular centering bushing is constructed of carbon.

3. The seal assembly of claim 1 wherein said biasing means includes a plurality of circumferentially spaced and axially extending compression springs disposed between opposing surfaces of said annular gland insert and said second seal face means.

4. The seal assembly of claim 1 wherein said key means includes a plurality of circumferentially spaced and axially extending pins carried by and projecting endwise outwardly from the second end of said second seal face means and guidingly and slidingly received in opposing bores formed in said annular gland insert.

5. In combination with a housing portion having a first shaft opening formed therein opening outwardly of an outer side portion of said housing portion surrounded by a first seal surface, a shaft loosely received through said shaft opening and projecting outwardly of said seal surface and a gland or clamp plate disposed outwardly of said first seal surface and having a second shaft opening formed therethrough through which said shaft is loosely received, a semi-cartridge seal assembly including a first holder sleeve snugly, slidably and rotatably disposed on said shaft within said first opening and including lock means operative to releasably lock said holder sleeve in position on said shaft after the desired position thereon has been established, first annular seal means operatively associated with said first holder sleeve and said shaft forming a fluid tight seal therebetween and operative to center said first holder sleeve relative to said shaft, a first annular seal face means loosely supported from said first holder sleeve generally concentric with said shaft and projecting axially of said first holder sleeve toward said first seal surface, second seal means forming a fluid tight seal between said first annular seal face means and said first holder sleeve and yieldably centering said first annular seal face means relative to said first holder sleeve, said annular seal face means facing outwardly of said shaft opening, but being recessed inwardly thereof relative to said first seal surface, an annular gland insert loosely disposed about said shaft between said first seal surface and said gland plate, a second holder sleeve loosely supported from said annular gland insert and guidingly supported for movement relative thereto toward and away from said first annular seal face means, means yieldingly biasing said second holder sleeve toward said first annular seal face means relative to said annular gland insert, third seal means forming a fluid tight seal between said annular gland insert and said second holder sleeve and operative to center the latter relative to said annular gland insert, a centering bushing carried by said annular gland insert and operatively associated with said shaft for centering said annular gland insert coaxially with said shaft, second annular seal face means supported from said second holder sleeve with said first and second seal face means substantially coaxial with each other and frictionally engaged with each other, said gland plate second shaft opening being smaller in diameter than the outside diameter of said annular gland insert and abutting said annular gland insert on the side thereof remote from said first seal surface, the end of said annular gland insert opposing said first seal surface and defining a second seal surface registered with said first seal surface, and means operatively connected between said housing portion and gland plate for adjustably drawing said gland plate toward said housing portion with said first and second seal surfaces sealed relative to each other, said second seal means also serving to frictionally retain said annular seal face means against rotation relative to said first holder sleeve.

6. The seal assembly of claim 5 wherein said centering bushing is constructed of carbon.

7. The seal assembly of claim 5 wherein said second annular seal face means is rigidly supported from said second holder sleeve.

8. The seal assembly of claim 5 wherein said first holder sleeve and said first annular seal face means comprise a preassembled component of said semi-cartridge seal assembly adapted to be snugly and slidably received on said shaft with one end of said component precisely axially positioned on said shaft a predetermined distance from a circumferential mark previously applied to said shaft, a U-shaped gauge including a pair of parallel, laterally spaced legs including corresponding first and second ends with an elongated bight portion extending between and rigidly connecting said one pair of ends, the spacing between said legs being equal to the axial length of said seal component, the effective length of said legs being at least equal to the radial thickness of said seal component and the thickness of said legs, measured in the plane of said U-shaped gauge being equal and equivalent said predetermined distance, whereby said seal component, after being placed upon said shaft may be embracingly engaged by said gauge and shifted along said shaft until the outer side of the leg opposing said one axial end of said component is precisely registered with said mark.

9. In combination with a shaft upon which a circumferential mark has been applied and an annular seal component disposed on and snugly slidable along said shaft with said seal component including one axial end to be precisely axially positioned on said shaft a predetermined distance from said mark, a U-shaped gauge including a pair of parallel, laterally spaced legs including corresponding first and second ends with an elongated bight portion extending between and rigidly connecting said one pair of ends, the spacing between said legs being equal to the axial length of said seal component, the effective length of said legs being at least equal to the radial thickness of said seal component and the thickness of said legs, measured in the plane of said U-shaped gauge being equal and equivalent said predetermined distance, whereby said seal component, after being placed upon said shaft may be embracingly engaged by said gauge and shifted along said shaft until the outer side of the leg opposing said one axial end of said component is precisely registered with said mark.

* * * * *